(12) United States Patent
Matsui et al.

(10) Patent No.: US 12,242,025 B2
(45) Date of Patent: Mar. 4, 2025

(54) SYNTHETIC QUARTZ GLASS SUBSTRATE WITH ANTIREFLECTION FILM, WINDOW MATERIAL, LID FOR OPTICAL ELEMENT PACKAGE, OPTICAL ELEMENT PACKAGE, AND LIGHT IRRADIATION DEVICE

(71) Applicant: Shin-Etsu Chemical Co., Ltd., Tokyo (JP)

(72) Inventors: Harunobu Matsui, Joetsu (JP); Daijitsu Harada, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 374 days.

(21) Appl. No.: 17/197,444

(22) Filed: Mar. 10, 2021

(65) Prior Publication Data
US 2021/0293994 A1    Sep. 23, 2021

(30) Foreign Application Priority Data

Mar. 18, 2020   (JP) .................................. 2020-047579

(51) Int. Cl.
*G02B 1/115*    (2015.01)
*F21V 3/06*    (2018.01)
(Continued)

(52) U.S. Cl.
CPC .............. *G02B 1/115* (2013.01); *F21V 3/061* (2018.02); *F21V 3/10* (2018.02); *G02B 5/0294* (2013.01)

(58) Field of Classification Search
CPC ....... G02B 1/115; G02B 5/0294; F21V 3/061; F21V 3/10
(Continued)

(56) References Cited

U.S. PATENT DOCUMENTS

| | | |
|---|---|---|
| 6,109,752 A | 8/2000 | Itoh et al. |
| 2005/0274898 A1 | 12/2005 | Watanabe et al. |

(Continued)

FOREIGN PATENT DOCUMENTS

| | | |
|---|---|---|
| JP | 11-87808 A | 3/1999 |
| JP | 2001-13304 A | 1/2001 |

(Continued)

OTHER PUBLICATIONS

English Translation of JP 2018-109657 A (Year: 2018).*
(Continued)

*Primary Examiner* — Elmito Breval
*Assistant Examiner* — Hana S Featherly
(74) *Attorney, Agent, or Firm* — Birch, Stewart, Kolasch & Birch, LLP

(57) ABSTRACT

A synthetic quartz glass substrate with an antireflection film, including: a synthetic quartz glass substrate; and an antireflection film formed on a main surface of the synthetic quartz glass substrate, wherein a contact angle measured by a sessile drop method of JIS R 3257:1999 of the main surface of the synthetic quartz glass substrate is within 5 degrees, and the antireflection film includes a first layer containing $Al_2O_3$, a second layer containing $HfO_2$, and a third layer containing $MgF_2$ or $SiO_2$ sequentially laminated on the main surface of the synthetic quartz glass substrate.

13 Claims, 2 Drawing Sheets

(51) Int. Cl.
*F21V 3/10* (2018.01)
*G02B 5/02* (2006.01)

(58) Field of Classification Search
USPC .................................................. 362/296.03
See application file for complete search history.

(56) References Cited

U.S. PATENT DOCUMENTS

| 2007/0134566 | A1 | 6/2007 | Maida et al. |
| 2019/0021314 | A1* | 1/2019 | Katagiri ................. B32B 27/16 |
| 2020/0124770 | A1 | 4/2020 | Maruyama |
| 2020/0194638 | A1 | 6/2020 | Kikuchi et al. |

FOREIGN PATENT DOCUMENTS

| JP | 2003-241139 A | 8/2003 |
| JP | 2004-302112 A | 10/2004 |
| JP | 2007-182367 A | 7/2007 |
| JP | 2009-27196 A | 2/2009 |
| JP | 2018-109657 A | 7/2018 |
| WO | WO 2016/182024 A1 | 11/2016 |
| WO | WO 2019/039440 A | 2/2019 |

OTHER PUBLICATIONS

English Translation of JP 2001-013304 A (Year: 2001).*
Balachandran et al., Effect of Cleaning and Storage on Quartz Substrate Ashesion and Surface Energy, Proceedings of the SPIE, vol. 9048, 2014, pp. 90480N1-90480N7 (7 pages total).
Extended European Search Report for European Application No. 21161879.8, dated Aug. 2, 2021.
Office Action issued Feb. 1, 2022, in Japanese Patent Application No. 2020-047579.
Office Action issued Jun. 29, 2021, in Japanese Patent Application No. 2020-047579.

* cited by examiner

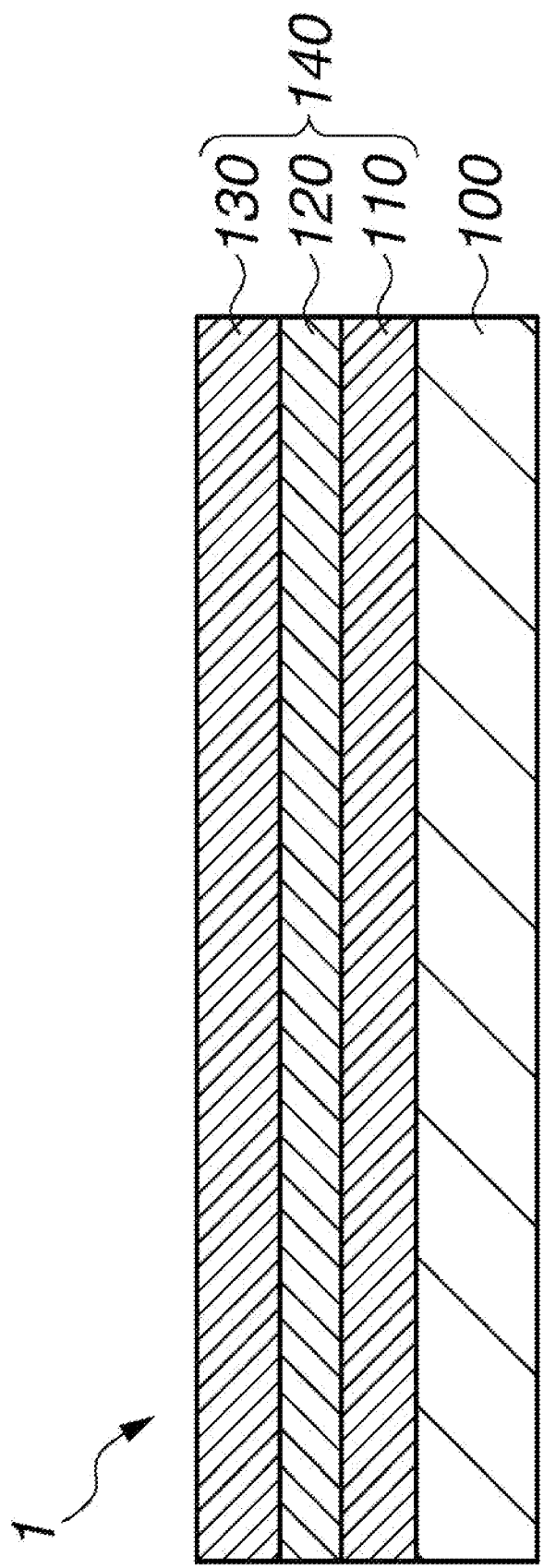

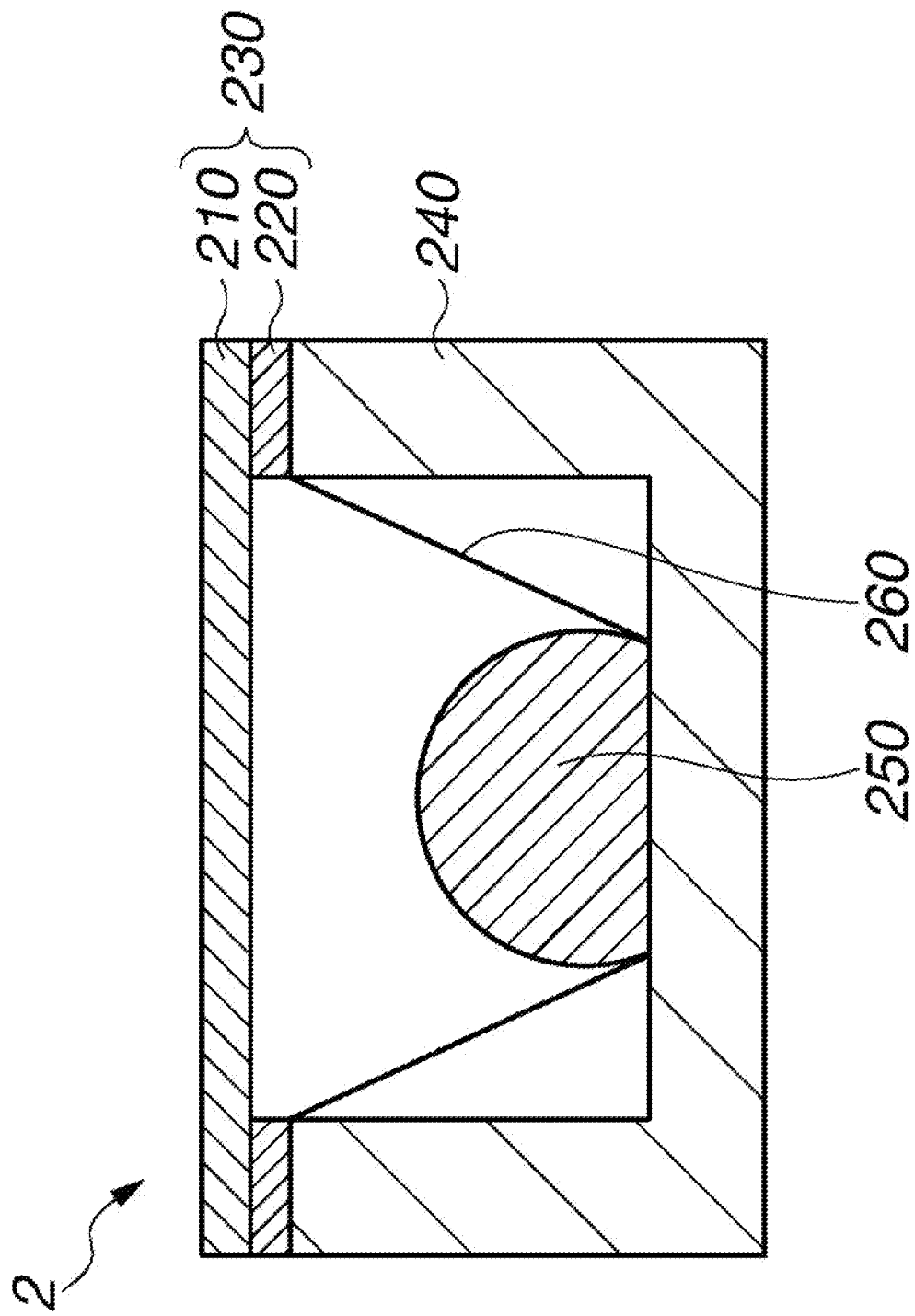

SYNTHETIC QUARTZ GLASS SUBSTRATE WITH ANTIREFLECTION FILM, WINDOW MATERIAL, LID FOR OPTICAL ELEMENT PACKAGE, OPTICAL ELEMENT PACKAGE, AND LIGHT IRRADIATION DEVICE

CROSS-REFERENCE TO RELATED APPLICATION

This non-provisional application claims priority under 35 U.S.C. § 119(a) on Patent Application No. 2020-047579 filed in Japan on Mar. 18, 2020, the entire contents of which are hereby incorporated by reference.

TECHNICAL FIELD

The present invention relates to a synthetic quartz glass substrate with antireflection film, a window material, a lid for an optical element package, an optical element package, and a light irradiation device.

BACKGROUND ART

UV-LEDs that can emit light in a deep ultraviolet region have been attracting attention. LEDs can extract any wavelength, and LEDs suitable for applications have been developed. For example, the wavelength of 265 to 285 nm, which is the UVC region, is known to be an effective wavelength for sterilization, and UV-LEDs that emit light of the wavelength have been developed for sterilization applications. However, it is not easy to increase the output of an LED chip, and it is required to improve the light extraction efficiency by a method other than increasing the chip output.

As a method of improving the light extraction efficiency, for example, there is a method of preventing light reflection loss due to a window material by using an optical element in a state of being wired to a package without being sealed with the window material. However, in consideration of the fact that many elements are usually used in the atmosphere, it is common to seal an optical element by using a window material. In particular, UV-LEDs are expected to be used for water sterilization, and in order to use electrical elements near moisture, hermetic sealing using a window material is essential. Then, synthetic quartz glass is mainly selected as the window material from the viewpoint of high transmission with respect to light in the ultraviolet region and long-term stability.

For example, Patent Document 1 reports a method of using a window material to which an antireflection film formed of a thin film having a specific film thickness is added in a case of sealing a carrier on which an element is arranged in manufacturing a deep ultraviolet light emitting device.

Further, Patent Document 2 reports a method of improving light distribution characteristics to improve the light extraction efficiency by forming a glass material as a window material into a lens shape.

CITATION LIST

Patent Document 1: JP-A 2018-109657
Patent Document 2: WO 2019/039440

SUMMARY OF THE INVENTION

However, Patent Document 1 does not specify the state of a substrate before the formation of the antireflection film, and there is a concern that, in the film formation of the antireflection film in which thin films are laminated, the transmission may fluctuate between substrates as a uniform film is not obtained at the interface between the substrate and a first layer. Furthermore, in a case where the antireflection film is formed with the above configuration, it is considered that high transmission cannot be achieved at wavelength of 260 nm or 300 nm, and the applicable wavelength range is narrow.

Further, Patent Document 2 reports a method of cutting out quartz glass from a base material to form a shape. However, it is extremely difficult and not economical to cut out pieces of quartz glass individually and at the same precision. Furthermore, in the method of molding by sintering powder, metal impurity contamination due to a molding material such as a mold is unavoidable at the time of sintering, and an obtained material is surmised as having no long-term reliability for the application in which irradiation with light of a short wavelength as in the deep ultraviolet region is continuously performed.

The present invention has been made in view of the above circumstances, and an object of the present invention is to provide a synthetic quartz glass substrate with an antireflection film which is stable for a long period of time as a window material of an optical element package or a light irradiation device having an optical element for a short wavelength, particularly in a deep ultraviolet region, does not change with time in a wide wavelength range, and can obtain high transmission, a window material, a lid for an optical element package, an optical element package, and a light irradiation device.

As a result of diligent studies to achieve the above object, the present inventors have found that a synthetic quartz glass substrate with an antireflection film having excellent light transmission can be obtained in a wide wavelength range particularly in the ultraviolet region by forming an antireflection film composed of three specific thin films on a synthetic quartz glass substrate having a predetermined contact angle, and completed the present invention.

Therefore, the present invention provides a synthetic quartz glass substrate with antireflection film, a window material, a lid for an optical element package, an optical element package, and a light irradiation device described below.

[1] A synthetic quartz glass substrate with an antireflection film, including a synthetic quartz glass substrate, and an antireflection film formed on a main surface of the synthetic quartz glass substrate, wherein a contact angle measured by a sessile drop method of JIS R 3257:1999 of the main surface of the synthetic quartz glass substrate is within 5 degrees, and the antireflection film includes a first layer containing $Al_2O_3$, a second layer containing $HfO_2$, and a third layer containing $MgF_2$ or $SiO_2$ sequentially laminated on the main surface of the synthetic quartz glass substrate.

[2] The synthetic quartz glass substrate with an antireflection film of [1], wherein optical film thicknesses of the first to third layers are in the following ranges, respectively:

$$0.20\lambda \leq n_1 d_1 \leq 0.30\lambda;$$

$$0.45\lambda \leq n_2 d_2 \leq 0.55\lambda; \text{ and}$$

$$0.20\lambda \leq n_3 d_3 \leq 0.30\lambda,$$

wherein n is a refractive index, d is a physical film thickness, $n_1 d_1$ to $n_3 d_3$ are optical film thicknesses of the first to third layers, respectively, and λ is a central wavelength of light transmitted through the synthetic quartz glass substrate with an antireflection film and is selected from a range of 255 to 300 nm.

[3] The synthetic quartz glass substrate with an antireflection film of [1] or [2], wherein, in a height histogram obtained by measuring, with an atomic force microscope, an optional 1 µm×1 µm region on a main surface of the synthetic quartz glass substrate, when a median height is defined as D50 and a height of 0.1% from a highest one is defined as D99.9, a relational expression of D99.9−D50<5 nm is satisfied.

[4] A window material made from the synthetic quartz glass substrate with an antireflection film of any one of [1] to [3].

[5] A lid for an optical element package having an adhesive layer on an outer peripheral edge of a main surface of the window material of [4].

[6] The lid for an optical element package of [5], wherein the adhesive layer is formed of a resin-based adhesive agent or a metal-based adhesive agent.

[7] An optical element package including a box-shaped housing member, an optical element for a wavelength of 255 to 300 nm housed in the housing member, and a lid for an optical element package covering an opening of the housing member, wherein the lid for an optical element package of [5] or [6] is joined to the opening of the housing member.

[8] The optical element package of [7] wherein the optical element is a light emitting element or a light receiving element.

[9] The optical element package of [8] wherein the optical element is a light emitting element.

[10] A light irradiation device including a housing having a light emission port, and at least one light source housed in the housing, wherein the light source is the optical element package of [9].

[11] The light irradiation device of [10], further including a window material covering the light emission port.

[12] The light irradiation device of [11], wherein the window material is the window material of [4].

Advantageous Effects of the Invention

According to the present invention, when a synthetic quartz glass substrate with an antireflection film is used as a window material of an optical element package having an optical element for a short wavelength, particularly in a deep ultraviolet region, the substrate is stable for a long period of time, does not change with time in a wide wavelength range, and can obtain high transmission.

Further, since the synthetic quartz glass substrate with an antireflection film of the present invention can reduce the reflection loss of light, the light extraction efficiency for light emitted from an LED can be expected to be improved, even for a light emitting element such as a UV-LED having a weak output.

BRIEF DESCRIPTION OF THE DRAWINGS

FIG. 1 is a cross-sectional view showing an example of a synthetic quartz glass substrate with an antireflection film according to the present invention; and FIG. 2 is a cross-sectional view showing an example of a surface mount type optical element package using the synthetic quartz glass substrate with an antireflection film according to the present invention as a window material.

DESCRIPTION OF THE PREFERRED EMBODIMENT

Hereinafter, the present invention is described in detail.
Synthetic Quartz Glass Substrate with Antireflection Film FIG. 1 shows an example of a cross-sectional structure of a synthetic quartz glass substrate with an antireflection film of the present invention. A synthetic quartz glass substrate 1 with an antireflection film shown here has, on the main surface of one or both sides of a synthetic quartz glass substrate 100, an antireflection film 140 formed by sequentially laminating a first layer 110 containing $Al_2O_3$, a second layer 120 containing $HfO_2$, and a third layer 130 containing $MgF_2$ or $SiO_2$. The synthetic quartz glass substrate 1 with an antireflection film having such a structure can improve the light transmission, particularly the light transmission at a wavelength of 255 to 300 nm.

Synthetic quartz glass is an extremely stable substance. However, for example, when synthetic quartz glass is irradiated with light having a wavelength of 255 to 300 nm in a state where the surface is contaminated with an organic substance, the organic substance is decomposed or structurally changed, and may lower the transmission of the substrate. Similarly, when an organic substance is present at the interface between the surface of the synthetic quartz glass substrate 100 and the thin film constituting the antireflection film 140, the organic substance is decomposed or structurally changed by light of a short wavelength, and the transmission of the substrate may be lowered. For this reason, the antireflection film is preferably formed in a state where, as the synthetic quartz glass substrate 100, only the silanol group of the synthetic quartz glass is exposed on the substrate surface, that is, in a state where the surface of the synthetic quartz glass substrate 100 is hydrophilic. From this point of view, the synthetic quartz glass substrate 100 is required to have a contact angle measured by the sessile drop method of Japanese Industrial Standard JIS R 3257:1999 of 5 degrees or less, preferably 3 degrees or less on its main surface when the antireflection film is formed. The present invention uses the synthetic quartz glass substrate 100 so as to be able to obtain the synthetic quartz glass substrate 1 with an antireflection film that has light transmission not lowered even when continuously irradiated with, for example, light having a wavelength of 255 to 300 nm and is stable for a long period of time.

The synthetic quartz glass substrate 100 is obtained by molding synthetic quartz glass ingot, annealing, slicing, chamfering, wrapping, polishing for making the substrate surface mirror-finished, and cleaning. Here, as a method of polishing the synthetic quartz glass substrate, a publicly-known method can be employed, and the method is not particularly limited. In the present invention, both sides may be finished at the same time by double-sided polishing, or single-sided polishing may be applied to each side for finishing.

As a cleaning method, a publicly-known method can be employed and the method is not particularly limited. In the present invention, for example, precision cleaning such as cleaning including an acid or alkali cleaning process, a rinsing process, and a vapor drying process using isopropyl alcohol is employed in DIP cleaning. Further, cleaning including an acid or alkali cleaning process, a rinsing process, and a spin drying process may be performed in single-wafer spin cleaning.

Examples of the acid that can be used for acid cleaning include nitric acid, sulfuric acid, fluorinated nitric acid, piranha solution, and hydrochloric acid hydrogen peroxide (SC-2 solution). Further, examples of alkalis that can be used for alkali cleaning include sodium hydroxide, potassium hydroxide, ammonia, and ammonia hydrogen peroxide (SC-1 solution). By immersing the synthetic quartz glass substrate in these acids or alkalis, water-repellent components, if present on the substrate surface, can be removed from the substrate surface. In this manner, the inherent hydrophilic surface of the synthetic quartz glass substrate can be exposed, and the contact angle can be adjusted to be within the range specified in the present invention.

The synthetic quartz glass substrate 100 can be brought into a dry state while the substrate surface is kept hydrophilic by performing vapor drying with isopropyl alcohol in the subsequent drying process. In this manner, the synthetic quartz glass substrate 100 having a surface suitable for forming the antireflection film 140 can be obtained.

Note that, even when the cleaned synthetic quartz glass substrate 100 is stored in a case that causes less outgassing, the cleaning process is preferably performed within 60 minutes, or more preferably 30 minutes, before the forming process of the antireflection film, since an organic film is gradually formed on the substrate surface.

As described above, as the polishing method of the synthetic quartz glass substrate, double-sided polishing may be used for finishing, or single-sided polishing may be applied to both sides for finishing. However, after that, it is important to carry out cleaning capable of sufficiently removing an abrasive used in the polishing process, and to control the surface so that a foreign matter does not reattach to the surface after the cleaning. For example, when a cerium oxide-based abrasive or a zirconia oxide-based abrasive is used for finish polishing, it is preferable to use a cleaning solution such as SC-1 cleaning solution in which the abrasive can be completely dissolved in the cleaning solution. Further, from cleaning to the formation of the antireflection film, it is preferable to handle the substrate in a clean environment such as a clean room so that a foreign matter is not attached to the surface of the substrate. By storing the substrate in a clean environment, it is possible to reduce the possibility of problems such as residual abrasives and foreign matter attaching to the synthetic quartz glass surface after cleaning. When the antireflection film is formed on the substrate surface on which an abrasive or a foreign matter is present, there is a case where the abrasive or the foreign matter becomes a step causing the film to be easily peeled off, or a desired reflection characteristic cannot be obtained. Furthermore, after the antireflection film is formed, there is a case where a foreign matter is decomposed by a light reaction while the substrate is used in a light irradiation device described later, and gas is generated. In such a case, voids are generated under the antireflection film, which may promote peeling of the film and deterioration of the reflection characteristics.

Regarding the method of observing the residual abrasive material and the attachment of a foreign matter, even if the dirt is not visible by visual inspection, it is possible to check the presence or non-presence of the residual abrasive material or the attachment of a foreign matter by observing an optional 1 μm×1 μm region using an atomic force microscope. In that case, in the height histogram obtained by measuring an optional 1 μm×1 μm region on the main surface of the synthetic quartz glass using an atomic force microscope, when the median height is defined as D50 and the height of 0.1% from the highest one is defined as D99.9, if the abrasive material remains or a foreign matter is attached, the attached part becomes high and the value of D99.9−D50 becomes large. In this manner, it is possible to detect the abrasive residue and a foreign matter on the substrate which may cause problems after film formation. For this reason, D99.9−D50<5 nm is preferable in terms of defining a surface with less abrasive residue and foreign matter. The surface of D99.95−D50<5 nm, more preferably D99.95−D50<3 nm, is desirable when the height of 0.05% from the highest one is defined as D99.95. Note that, a case where the maximum value of Rmax or the height histogram in similar parameters is defined as D100 and compared with the median value can also be considered. However, since it is affected by a small amount of a foreign matter which does not affect the noise of the atomic force microscope, peeling of the antireflection film, and the antireflection characteristics, D100 is not suitable to be employed as the definition. Accordingly, the present invention employs parameters of D99.9 and D99.95 which are statistically reliable.

A pit defect, a scratch defect, a planar defect, and a volume defect, which are considered to be defects of an antireflection film as indicated by Japanese Industrial Standard JIS B 7080-1:2015 or ISO 9211-1:2010, may be caused by a raw material of a vapor deposition material. However, the defects may also be caused by a surface foreign matter on the surface of the synthetic quartz glass substrate that is formed as described above. In the present invention, since the synthetic quartz glass substrate 100 is a surface whose height histogram obtained by measurement with an atomic force microscope is controlled, for example, the probability that a problem, such as film peeling or swelling, which is one of volume defects occurs can be significantly reduced. Furthermore, even in long-term use, it is expected that the risk elements caused by the defects can be eliminated, which helps to form a physically stable film.

The shape of the synthetic quartz glass substrate 100 may be a plate shape, a spherical shape having an uneven shape, or an aspherical shape having an uneven shape. For the purpose of simply sealing a housing in which the optical element is disposed, a plate-shaped one is preferable from the viewpoint of economy and ease of handling.

On the other hand, to efficiently extract the light emitted from the optical element, a spherical or aspherical surface such as a simple plano-convex lens shape, a plano-concave lens shape, or a convex meniscus lens shape having a concavo-convex shape designed based on optical calculation can be selected.

The thickness of the synthetic quartz glass substrate 100 can be appropriately selected by considering the attenuation of the wavelength of light from the light emitting element and a difference in pressure (atmospheric pressure or water pressure) from the outside of the window material, that is, the outside of the optical element package. When used for the application of sealing the optical element package, that is, as a synthetic quartz glass lid, the thickness is preferably 0.1 mm or more, more preferably 0.2 mm or more, and the upper limit of the thickness is preferably 5 mm or less, more preferably 4 mm or less. On the other hand, when used for the application of sealing the light irradiation device, the thickness is preferably 1 mm or more, more preferably 2 mm or more, and the upper limit of the thickness is preferably 50 mm or less, more preferably 45 mm or less.

Next, the antireflection film 140 is described.

The antireflection film 140 has, on the entire main surface of the synthetic quartz glass substrate 100, the first layer 110 containing $Al_2O_3$, the second layer 120 containing $HfO_2$, and the third layer 130 containing MgF$_2$ or SiO$_2$ sequentially laminated in this order from the synthetic quartz glass substrate 100 side.

The first layer 110 is a thin film formed directly on the synthetic quartz glass substrate 100. The synthetic quartz glass substrate 100 has a refractive index of 1.4, and the antireflection film 140 is designed to be composed of three layers of thin films. From this, the refractive index required for the thin film of the first layer 110 is larger than that of the synthetic quartz glass substrate and smaller than that of the second layer as a condition. Further, for the thin film of the first layer 110, a material that has high adhesion to the synthetic quartz glass substrate 100 and hardly becomes an inhomogeneous film during film formation. Furthermore, since the synthetic quartz glass substrate 1 with an antireflection film of the present invention is intended to be used particularly at a wavelength of 255 to 300 nm, it is not preferable to select a substance that absorbs light in the wavelength range. From the above viewpoint, Al$_2$O$_3$ (refractive index: 1.62) can be considered as a candidate for the thin film selected from generally available materials, and in the present invention, a thin film containing Al$_2$O$_3$ is selected as the first layer 110. Note that SiO$_2$ (refractive index: 1.42) is also considered as a substance that satisfies the condition under the above viewpoint. However, considering that the synthetic quartz glass substrate 100 is amorphous of SiO$_2$ having extremely high purity, it is not suitable to form a film of SiO$_2$ of the same type as the first layer 110.

The second layer 120 is an intermediate layer of the antireflection film 140. Antireflection films with a single-layer or two-layer structure often have a narrow wavelength range that can exhibit high transmission and often have a high-transmission region divided into two (W type), and are difficult to use practically. In particular, this tendency is remarkable in the wavelength region of deep ultraviolet rays. In view of the above, by forming the second layer 120 as a relaxation layer, it is possible to form the antireflection film 140 that stably exhibits high transmission in the entire range when used in the wavelength range of 255 to 300 nm. In this case, since a thin film containing Al$_2$O$_3$ that has a relatively small refractive index is selected in the first layer 110, it is desirable that the second layer 120 be formed of a substance having a high refractive index. Furthermore, since a substance that absorbs light in the wavelength range of 255 to 300 nm cannot be selected, it is desirable to select a thin film containing HfO$_2$ (refractive index: 2.20) as the second layer 120. Note that, as a film having a high refractive index and resistance to ultraviolet light, a thin film containing ZrO$_2$ can also be considered as a candidate. However, ZrO$_2$ tends to be an inhomogeneous film, and there concerns such as that it is difficult to control the film forming conditions and adhesion to the first layer 110 or the third layer 130 is deteriorated.

The third layer 130 is the outermost layer of the antireflection film 140. For the outermost layer, a thin film having a characteristic of lowering a reflectance is selected. That is, it is required to be made from a substance having a low refractive index. Since the substrate on which the antireflection film 140 is formed is the synthetic quartz glass substrate 100 having a low refractive index, the refractive index of the third layer 130, which is the outermost layer, is preferably close to the refractive index of synthetic silica. Furthermore, when the substrate is used in the wavelength range of 255 to 300 nm, since a substance that absorbs light in the wavelength range cannot be selected, it is desirable to select a thin film containing MgF$_2$ (refractive index: 1.41) or SiO$_2$ as the third layer 130.

In a case where a thin film containing MgF$_2$ is selected as the third layer 130, even if the optical film thickness deviates from a design target value by about ±0.1λ, the thin film sufficiently functions as a low refractive index material required for the outermost layer due to the fact that MgF$_2$ is a substance having stable low refractive index characteristics, as well as that the second layer 120 is designed to reduce deviation of an optical path length in the antireflection film 140 of the present invention. Note that, MgF$_2$ is fluoride and has high hygroscopicity. For example, when left in the air for a long time, MgF$_2$ absorbs moisture in the air, and, as a result, the adhesion between the second layer 120 and the third layer 130 is deteriorated, and a partial detachment may be generated. In this case, a layer of air enters the location where the detachment occurs, and there is a case where the permeability as designed cannot be obtained. Therefore, the synthetic quartz glass substrate 1 with an antireflection film obtained by forming a thin film containing MgF$_2$ on the outermost layer is desirably used in an environment where humidity measures are taken such as in an inert gas environment or a dry air environment.

When a thin film containing SiO$_2$ is selected as the third layer 130, although SiO$_2$ has a characteristic that the reflectance is slightly higher than that of MgF$_2$, no major problems occur if the optical film thickness is controlled within ±0.05λ with respect to the design target value. Further, since SiO$_2$ is an oxide, the film density is higher than that of MgF$_2$ which is fluoride, and water molecules are less likely to enter the thin film, so that environmental dependence relating to film resistance such as moisture resistance is improved. Therefore, for example, when the substrate is used in a moist environment in, for example, a water sterilization module application which is suggested as the application of use of the deep ultraviolet LED, it is desirable to select a thin film containing SiO$_2$ as the final layer.

The antireflection film 140 has the above-mentioned three-layer thin film structure, and by controlling the optical film thickness of each layer, for example, the transmission for light having a wavelength of 255 to 300 nm can be improved.

There is also a method of designing a film with high transmission by laminating a plurality of layers having extremely thin film thickness, which is generally called an equivalent film. However, there is a case where a physical film thickness needs to be controlled to be within several nanometers, and there is a risk of failure in film formation if the thin films are laminated by the vacuum vapor deposition method or the like.

Here, considering the reflection at the upper and lower interfaces of the thin film, the light entering the thin film repeats free-end reflection or fixed-end reflection at the interface. In the thin film (refractive index n), the wavelength $\lambda_0$ of light is $\lambda_0/n$, and if an optical film thickness nd of the thin film is nd=0.25×$\lambda_0$, the phases of light are theoretically aligned. From this, the antireflection film can be designed by setting the optical film thickness of the thin film to an integral multiple of 0.25×λ.

On the other hand, from the viewpoint of monitoring accuracy when forming the antireflection film 140, that is, film thickness control, the optical film thickness of each layer is preferably 0.75λ or less. If the optical film thickness is thicker than 0.75λ, problems such as temperature unevenness are likely to occur during film formation, and there is a concern that the thin film may become inhomogeneous. Further, since some high purity and expensive targets are needed to form the thin films which make antireflection layer, the closer the optical film thickness of each layer is to $0.25\lambda$, the more economically advantageous it is.

Since the antireflection film 140 has a three-layer structure, $n_1d_1 \approx n_2d_2 \approx n_3d_3 \approx 0.25\lambda$ is the optimum solution from the viewpoint of economy and film formation time. Here, n represents the refractive index, d represents the physical film thickness, and $n_1d_1$ to $n_3d_3$ represent the optical film thickness of the first layer 110 to the third layer 130, respectively. $\lambda$ represents the central wavelength of light transmitted through a synthetic quartz glass substrate with an antireflection film, and is selected from the range of 255 to 300 nm.

Here, the characteristic matrix of the single-layer thin film is represented by the following equation (1):

$$M = \begin{bmatrix} \cos\delta & \left(\dfrac{i\sin\delta}{n}\right) \\ in\sin\delta & \cos\delta \end{bmatrix} \qquad (1)$$

wherein i is the imaginary unit ($i^2=-1$), and n is the same as above.

Then, the characteristic matrix of the three-layered thin film is represented by the following equation (2):

$$M = \begin{bmatrix} 0 & i/n_1 \\ in_1 & 0 \end{bmatrix} \begin{bmatrix} 0 & i/n_2 \\ in_2 & 0 \end{bmatrix} \begin{bmatrix} 0 & i/n_3 \\ in_3 & 0 \end{bmatrix} = \begin{bmatrix} 0 & -in_2/n_1n_3 \\ -in_1n_3/n_2 & 0 \end{bmatrix} \qquad (2)$$

wherein $n_1$ to $n_3$ represent the refractive indices of the first layer to the third layer, respectively, and i is the same as above.

In a case where synthetic fused silica is used as the substrate, when design with the characteristic matrix M is performed by setting the optical film thickness of each layer to $0.25\lambda$, a thin film where the refractive index $n_2$ of the second layer 120 is 1.19 is required. However, since there is no substance by which a thin film having a refractive index close to this refractive index can be formed, it is not possible to obtain an antireflection film exhibiting high transmission in the wavelength range of 255 to 300 nm under the above conditions.

From the above results, considering a film design that does not affect the refractive index of the second layer 120 as an improvement measure, with the characteristic matrix M of the thin film having a three-layer structure, only the part related to the second layer 120 is designed as a unit matrix, that is, $n_2d_2=0.5\lambda$, so that the reflectance is not affected. At this time, the characteristic matrix M is represented by the following equation (3):

$$M = \begin{bmatrix} 0 & i/n_1 \\ in_1 & 0 \end{bmatrix} \begin{bmatrix} -1 & 0 \\ 0 & -1 \end{bmatrix} \begin{bmatrix} 0 & i/n_3 \\ in_3 & 0 \end{bmatrix} = \begin{bmatrix} n_3/n_1 & 0 \\ 0 & n_1/n_3 \end{bmatrix} \qquad (3)$$

wherein $n_1$, $n_3$, and i are the same as above.

In the present invention, the substance constituting the second layer 120 preferably has a higher refractive index than the substances of the first layer 110 and the third layer 130 in consideration of the transmission of the antireflection film.

With this design, a reflectance R of the antireflection film 140 is determined by the refractive index values of the first layer 110 and the third layer 130, considering the phase difference at the thin film interface. When calculating the characteristic matrix of the thin film assuming an ideal state in which the reflectance R=0, it is only required to search for a thin film that meets the conditions represented by the following equation (4):

$$R = \dfrac{(n_0 n_3^2 - n_m n_1^2)^2}{(n_0 n_3^2 + n_m n_1^2)^2} = 0 \qquad (4)$$

wherein $n_0$ represents the refractive index of the environment where the antireflection film is placed, and $n_m$ represents the refractive index of the substrate, and $n_1$ and $n_3$ are the same as above.

Note that, in the present invention, since it is assumed that light passes through the synthetic quartz substrate 1 with an antireflection film and then escapes into the atmosphere, an air refractive index of 1.00 can be applied as $n_0$. When synthetic quartz glass is used as the substrate, a refractive index of $n_m=1.4$, if a thin film containing $SiO_2$ or $MgF_2$ is formed as a thin film having the characteristic of lowering the reflectance on the third layer 130, a refractive index of $n_3 \approx 1.42$ is given, so that $n_1 \approx 1.69$ is obtained, and it is possible to use a thin film containing $Al_2O_3$, which has a refractive index of about 1.62 and is stable.

Further, in view of the fact that, even if the film is formed assuming an ideal state where the reflectance R=0, the light transmission changes depending on the homogeneity of the thin film and the flatness of the interface, and that controlling the physical film thickness of the thin film on the nano-order is difficult, the optical film thickness of each of the above layers is preferably designed in the range of $\pm 0.05\lambda$, more preferably $\pm 0.03$ k, with respect to the central optical film thickness represented by the following equation, depending on the film forming condition:

$$n_1d_1 = n_3d_3 = 0.25\lambda$$
$$n_2d_2 = 0.50\lambda$$

wherein n, d, $n_1d_1$ to $n_3d_3$, and $\lambda$ are the same as above.

Each thin film designed as described above can be formed by a general method. For example, the film can be formed by using a physical vapor deposition method such as a vacuum vapor deposition method, an RF sputtering method, or an ion plating method, or a chemical vapor deposition method. From the viewpoint of the accuracy of film formation, it is preferable to use the vacuum vapor deposition method, and the electron beam method is preferably used as the vacuum vapor deposition method.

The synthetic quartz glass substrate 1 with an antireflection film can be obtained by forming each thin film of the first layer 110 to the third layer 130 on the main surface of the synthetic quartz glass substrate 100 using the above-mentioned film forming method. At this time, as shown in FIG. 1, the antireflection film 140 may be formed on at least one side of the main surface of the synthetic quartz glass substrate 100. However, the antireflection film 140 may be formed on both sides of the main surface of the synthetic quartz glass substrate 100 depending on the application, usage environment, and the like (not shown).

From the above, the preferable range of the optical film thickness of the first layer to the third layer in the antireflection film 140 of the synthetic quartz glass substrate 1 with an antireflection film is $0.20\lambda \leq n_1d_1 \leq 0.30\lambda$ $0.45\lambda \leq n_2d_2 \leq 0.55\lambda$ $0.20\lambda \leq n_3d_3 \leq 0.30\lambda$ wherein n, d, $n_1d_1$ to $n_3d_3$, and λ are the same as above, and a more preferable range is $$0.22\lambda \leq n_1d_1 \leq 0.28\lambda$$

$$0.47\lambda \leq n_2d_2 \leq 0.53\lambda$$

$$0.22\lambda \leq n_3d_3 \leq 0.28\lambda$$

wherein n, d, $n_1d_1$ to $n_3d_3$, and λ are the same as above.

The synthetic quartz glass substrate 1 with an antireflection film of the present invention can be suitably used particularly when transmitting light having a wavelength of 255 to 300 nm. For example, in the case of a UV-LED used for the application in which long-time use is assumed, the light extraction efficiency can be improved stably for a long time period.

Window Material

The synthetic quartz glass substrate 1 with an antireflection film can be preferably used as a window material (lid for the optical element package) that covers an opening of a housing member of the optical element package, a window material that covers a light emission port of a housing of the light emitting device, and the like. In particular, the synthetic quartz glass substrate 1 with an antireflection film can be more preferably used as a window material for covering an open portion of a housing member in which an optical element against 255 to 300 nm is housed and a surface facing the element is open.

Lid for Optical Element Package

The lid for an optical element package has an adhesive layer of an adhesive agent on the surface of the window material, for example, on the outer peripheral edge of the main surface of the window material, which is a portion where the window material is in contact with the housing member.

Here, the adhesive agent, which is not particularly limited, is preferably a resin-based adhesive agent or a metal-based adhesive agent.

The resin-based adhesive agent is formed of resin-based paste containing adhesive resin, and the adhesive resin has a network in the structure and a three-dimensional structure can be formed. Accordingly, the resin-based adhesive agent can be adhered to a synthetic quartz glass substrate, and can also be adhered to many materials such as ceramics and metal plates.

Examples of the resin-based adhesive agent include an ultraviolet-curable adhesive agent and a silicone-based adhesive agent. Specific examples of the resin-based adhesive agent include TB3114 (manufactured by ThreeBond Holdings Co., Ltd.) and KER-3000-M2 (manufactured by Shin-Etsu Chemical Co., Ltd.).

On the other hand, examples of the metal-based adhesive agent include adhesive agents containing one or more elements selected from a group including gold, silver, copper, palladium, tin, bismuth, and tellurium. The metal element may be in the bulk state in the adhesive agent or in the state of nanoparticles coated with a protective agent. Further, metal containing solder powder having solder properties can also be used.

The metal constituting the metal-based adhesive agent is preferably one or more metals selected from a group including gold, silver, and copper, an alloy containing this metal, or a mixture of this metal and another kinds of metals. In the case of the alloy or the mixture, one or more metals selected from a group including gold, silver, and copper are preferably 80 wt % or more of the total metal nanoparticles.

The mean particle size (average primary particle size) $D_{50}$ (volume average median size) of primary particles of the metal nanoparticles is, from the viewpoint of facilitating handling, preferably 20 nm or more, more preferably 30 nm or more, and the upper limit of the mean particle size is preferably 90 nm or less, more preferably 80 nm or less. A value measured by a dynamic light scattering method can be applied to this particle size.

As the solder powder, a commercially available product containing the above metal can be used, and specific examples of the solder powder include Au—Sn solder and Sn—Bi solder.

As a method for applying the adhesive agent, a publicly-known method can be applied, and specific examples the method include dispenser application, screen printing, and inkjet printing.

Optical Element Package

The optical element package of the present invention includes a box-shaped housing member (package carrier), an optical element for a wavelength of 255 to 300 nm housed in the housing member, and a lid for an optical element package covering the opening of the housing member. The lid for an optical element package is joined to the opening of the housing member.

FIG. 2 shows an example of the optical element package of the present invention. In FIG. 2, in an optical element package 2, for example, an optical element 250 is arranged in the center of the bottom of a housing member (package carrier) 240 formed in a square box shape, a lid 230 for an optical element package having an adhesive layer 220 on the outer peripheral edge of the main surface of a window material 210 made from the synthetic quartz glass with an antireflection film is provided so as to cover the upper end open portion of the package carrier 240, and the window material 210 is joined to the upper end face (frame portion) of the package carrier 240 with the adhesive layer 220 interposed between them. Note that, FIG. 2 shows a reflector 260. Further, the package carrier 240 may have a recessed portion (not shown) as a housing portion of the optical element 250 at the bottom.

As the package carrier 240, a publicly-known member can be used as a member for housing the optical element 250 in the optical element package 2. For example, one formed of an inorganic material such as metal and ceramics and an organic material such as rubber, elastomer, and resin can be used. Note that, in a case where the optical element is a light emitting element described later, the luminous efficiency of the optical element may be lowered when the optical element becomes a high temperature state due to the heat generated by the element. In such a case, the package carrier 240 is preferably one made from alumina-based ceramics or alumina nitride-based ceramics having excellent heat dissipation, or one formed by using metal plating of gold, copper, or the like as a heat-dissipating material. Further, the size of the package carrier 240 is appropriately selected depending on the application of the optical element, the size of the optical element to be housed, the size of the window material, and the like.

The optical element 250 disposed inside the package carrier 240 may be a light emitting element or a light receiving element. The optical element package 2 of the present invention is particularly preferable for an optical element capable of emitting or receiving light having a wavelength of 300 nm or less. Specific examples of the optical element include a light emitting element having a central emission wavelength of 255 to 300 nm, a light receiving element having a peak sensitivity wavelength of 255 to 300 nm, and the like.

Examples of the light emitting element include a UV-LED (central wavelength of 260 to 300 nm) using aluminum gallium nitride (AlGaN), an ArF excimer laser (wavelength 193 nm), a KrF excimer laser (wavelength 248 nm), a YAG FHG (fourth high frequency) laser (wavelength 266 nm), and the like.

Examples of the light receiving element include a photodiode.

In the range surrounded by the package carrier 240 and the window material 210, the optical element 250, as well as leads (not shown) for electrical conduction between the optical element 250 and the outside of the optical element package 2 and other members such as the reflector 260 for increasing the light extraction efficiency can be provided. The inside of the optical element package 2 is preferably in a vacuum state or in a state filled with inert gas such as nitrogen and argon in order to prevent deterioration of the optical element 250.

The optical element package of the present invention can be manufactured by joining the lid for an optical element package of the present invention to the housing member (package carrier) in which the optical element is housed. At this time, the joining between the package carrier and the lid for an optical element package is carried out by an appropriate means such as heating or pressurization, depending on the type of the adhesive agent constituting the adhesive layer of the lid for an optical element package.

Light Irradiation Device

The light irradiation device of the present invention includes a housing having a light emission port and at least one light source housed in the housing, and the light source is the optical element package including a light emitting element as an optical element.

The shape of the housing is not particularly limited as long as the housing has space for housing a light source and a light emitting port capable of emitting light emitted from the light source. Specific examples of the shape include a cylindrical shape, a hollow substantially cylindrical shape, a prismatic shape, and a hollow substantially prismatic shape. As the material forming the housing, a metal material such as SUS, which is less likely to be deteriorated by ultraviolet light, is preferable in consideration of the fact that the housing is also irradiated with ultraviolet light.

As the light source, the above-mentioned optical element package of the present invention is used. Specific examples of the light source include an ultraviolet LED surface mount package (UV-LED SMD PKG) sealed by a lid for an optical element package using the synthetic quartz glass substrate with an antireflection film of the present invention. The UV-LED SMD PKG has a wide range of sizes such as 3.5 mm square and 6.0 mm square. The UV-LED SMD PKG incorporated in the housing as a module is appropriately selected according to the application. Further, the size of the synthetic quartz glass lid with an antireflection film also follows the size of the UV-LED SMD PKG.

At least one light source is only required to be provided in the housing, and the number of light sources may be appropriately set according to the application and purpose of the light emitting device. Further, the arrangement of the light source is not particularly limited, and can be appropriately set according to the application and purpose. For example, when the light source is used in a device for resin curing that needs to perform irradiation with light over a large area at one time, the light source is disposed in a plane at a position facing the light emission port. Further, in the case of applications requiring pressure resistance such as water sterilization applications, for example, the UV-LED SMD PKG is disposed at a position facing the window material as sealing glass in the cylindrical housing made from SUS.

The light irradiation device may further include a window material that covers the light emission port. The window material can be used without particular limitation as long as the window material transmits light emitted from an optical element package such as a synthetic quartz glass substrate. In the light irradiation device of the present invention, the influence of the external environment on the optical elements arranged in the UV-LED SMD PKG can be further reduced by sealing the optical element package with such a window material. At this time, from the viewpoint of improving the extraction efficiency of short wavelength light emitted from the light emitting element, it is preferable to use the above-mentioned synthetic quartz glass substrate with an antireflection film of the present invention as the window material. The synthetic quartz glass substrate with an antireflection film may have an antireflection film formed on one side or both sides. However, in applications where a fluid is expected to come into direct contact with the surface of the synthetic quartz glass substrate, such as the water sterilization application, the antireflection film may peel off due to friction with the fluid. Accordingly, from the viewpoint of friction resistance, the antireflection film is preferably designed to be formed only on the surface on the light source side. Further, the window material of the light irradiation device may be joined with an adhesive agent, or may be fixed by tightening with a flange or the like.

Note that, in a case where the light irradiation device is designed using highly directional light such as UV-LED, a diffuser plate made from synthetic quartz glass can be inserted between the UV-LED SMD PKG and the window material attached to the light emission port in order to prevent uneven hitting of light on an object to be irradiated with the light.

EXAMPLES

Hereinafter, the present invention is specifically described with reference to Examples and Comparative Examples. However, the present invention is not limited to the Examples described below.

(1) Production of Glass Substrate with Antireflection Film

Example 1

After wrapping a sliced synthetic quartz glass wafer substrate (four inches in diameter) with a double-sided lapping machine that performs planetary motion, mirror finish processing was performed using a cerium oxide-based abrasive (MIREK E-10 manufactured by Mitsui Mining & Smelting Co., Ltd.) in a double-side polishing machine that performs planetary motion, and a synthetic quartz glass wafer substrate having both sides mirror-finished with a thickness of 0.5 mm was obtained. SC-1 cleaning, rinsing, and vapor drying with isopropyl alcohol were performed for the obtained synthetic quartz glass wafer substrate to clean the substrate surface.

The contact angle on the main surface of the substrate was measured by dropping water droplets on this synthetic quartz glass wafer substrate in accordance with the sessile drop method of the Japanese Industrial Standard JIS R 3257:1999, and was 3.8 degrees on both sides. Further, near the center of the main surface of the synthetic quartz glass wafer substrate, a region of 1 μm×1 μm was measured with an atomic force microscope with the resolution of 256 pixel squares at one measurement point, and the height histogram distribution was analyzed. When the height of the median value was defined as D50 and the height of 0.1% from the highest was defined as D99.9, the value of D99.9−D50 was 1.3 nm, and no residual abrasive material or adhesion of a foreign matter was observed.

Using the synthetic quartz glass wafer substrate as a substrate, thin films of the first layer to the third layer were sequentially formed from the substrate side as a substrate by a vacuum vapor deposition method. The antireflection film was formed on both sides of the main surface of the substrate. Table 1 shows the composition and optical film thickness of each thin film.

The transmission by vertical incidence of the obtained synthetic quartz glass substrate with an antireflection film was measured using a spectrophotometer (Cary4000 manufactured by Agilent Technologies). Table 2 shows the initial transmission at each wavelength (λ).

The synthetic quartz glass substrate with an antireflection film was left to stand for 2,400 hours in a constant temperature and humidity environment of 85° C.-85% RH while being irradiated with light emitted from a 30-mW class UVC-LED against of 285 nm, and the transmission was measured again. The transmission was the same as that in the initial state. Further, no problems such as detachment in the antireflection film were observed.

Example 2

A synthetic quartz glass substrate with an antireflection film was manufactured in the same manner as in Example 1 except that the composition of each layer and the optical film thickness were changed as shown in Table 1, and the transmission was measured. Table 2 shows the initial transmission at each wavelength.

The synthetic quartz glass substrate with an antireflection film was left to stand for 2,400 hours in a constant temperature and humidity environment of 60° C.-90% RH while being irradiated with light emitted from a 30-mW class UVC-LED against 265 nm, and the transmission was measured again. The transmission was the same as that in the initial state. Further, no problems such as detachment in the antireflection film were observed.

Example 3

A synthetic quartz glass substrate with an antireflection film was manufactured in the same manner as in Example 1 except that the composition of each layer and the optical film thickness were changed as shown in Table 1 and the antireflection film was formed only on one side of the main surface of the substrate, and the transmission was measured. Table 2 shows the initial transmission at each wavelength.

The synthetic quartz glass substrate with an antireflection film was left to stand for 2,400 hours in a constant temperature and humidity environment of 85° C.-85% RH while being irradiated with light emitted from a 30-mW class UVC-LED against 285 nm, and the transmission was measured again. The transmission was the same as that in the initial state. Further, no problems such as detachment in the antireflection film were observed.

Example 4

After polishing, the synthetic quartz glass wafer substrate that had been polished in the same manner as in Example 1 was rinsed with ultrapure water and vapor-dried with isopropyl alcohol. When the surface condition of the substrate was evaluated, the contact angle was 4.1 degrees on both sides, and the value of D99.9−D50 was 6.3 nm.

Using the synthetic quartz glass wafer substrate as a substrate, an antireflection film having the same configuration as that of Example 1 was formed by a vacuum vapor deposition method. Table 2 shows the initial transmission at each wavelength.

The synthetic quartz glass substrate with an antireflection film was left to stand for 2,400 hours in a constant temperature and humidity environment of 85° C.-85% RH while being irradiated with light emitted from a 30-mW class UVC-LED against 285 nm, and the transmission was measured again. Although lowered by about 1% to 1.5% as compared with the initial transmission, the transmission has not critical problem. Further, when the antireflection film was observed with an optical microscope, voids having a diameter of about 10 to 100 μm were occasionally found.

Comparative Example 1

The transmission by vertical incidence of a synthetic quartz glass wafer substrate having a thickness of 0.5 mm, which was the same as that in Example 1 except that an antireflection film was not formed, was measured by using a spectrophotometer (Cary4000 manufactured by Agilent Technologies). Table 2 shows the initial transmission at each wavelength.

Comparative Example 2

The synthetic quartz glass substrate that had been polished and cleaned in the same manner as in Example 1 was placed in a grooved acrylic resin case for housing a wafer having a diameter of four inches and stored for 72 hours. When the surface condition of the substrate was evaluated, the contact angle was 43 degrees on both sides, and the value of D99.9−D50 was 3.3 nm.

Using the synthetic quartz glass wafer substrate as a substrate, an antireflection film having the same thin film configuration as that of Example 1 was formed by a vacuum vapor deposition method. Table 2 shows the initial transmission at each wavelength.

When the cross section of the antireflection film was observed by SEM with respect to the synthetic quartz glass substrate with the antireflection film, it was confirmed that detachment occurred at the interface between the substrate and the first layer, and the adhesion of the film was not perfect.

Comparative Example 3

The synthetic quartz glass substrate that had been polished and cleaned in the same manner as in Example 1 was placed in a grooved acrylic resin case for housing a wafer having a diameter of four inches and stored for 24 hours. When the surface condition of the substrate was evaluated, the contact angle was 11 degrees on both sides, and the value of D99.9−D50 was 2.9 nm.

Using the synthetic quartz glass wafer substrate as a substrate, an antireflection film having the same thin film configuration as that of Example 1 was formed by a vacuum vapor deposition method. Table 2 shows the initial transmission at each wavelength.

When the cross section of the antireflection film was observed by SEM with respect to the synthetic quartz glass substrate with the antireflection film, it was confirmed that detachment occurred at the interface between the substrate and the first layer, and the adhesion of the film was not perfect.

TABLE 1

|  | Thin film composition | | Refractive index (n) | Optical film thickness (nd) |
|---|---|---|---|---|
| Examples 1, 4 | Third layer | $SiO_2$ | 1.42 | $0.23\lambda$ |
| Comparative Examples 2, 3 | Second layer | $HfO_2$ | 2.20 | $0.50\lambda$ |
| | First layer | $Al_2O_3$ | 1.82 | $0.25\lambda$ |
| Example 2 | Third layer | $MgF_2$ | 1.41 | $0.28\lambda$ |
| | Second layer | $HfO_2$ | 2.20 | $0.47\lambda$ |
| | First layer | $Al_2O_3$ | 1.82 | $0.27\lambda$ |
| Example 3 | Third layer | $SiO_2$ | 1.42 | $0.21\lambda$ |
| | Second layer | $HfO_2$ | 2.20 | $0.48\lambda$ |
| | First layer | $Al_2O_3$ | 1.82 | $0.22\lambda$ |

TABLE 2

| $\lambda$ (nm) | | 255 | 265 | 280 | 285 | 300 |
|---|---|---|---|---|---|---|
| Transmission (%) | Example 1 | 98.68 | 98.47 | 98.28 | 98.27 | 98.98 |
| | Example 2 | 98.73 | 98.66 | 98.58 | 98.61 | 99.01 |
| | Example 3 | 95.23 | 95.36 | 95.51 | 95.58 | 96.00 |
| | Example 4 | 98.58 | 98.55 | 98.45 | 98.21 | 98.77 |
| | Comparative Example 1 | 92.20 | 92.29 | 92.49 | 92.50 | 92.85 |
| | Comparative Example 2 | 87.87 | 87.47 | 88.98 | 87.21 | 87.78 |
| | Comparative Example 3 | 91.10 | 91.15 | 91.25 | 92.06 | 91.73 |

(2) Production of Lid for Optical Element Package Made from Glass Substrate with Antireflection Film Example 5

On the outer peripheral edge of the main surface of the synthetic quartz glass substrate with an antireflection film produced in Example 1, a metal-based adhesive agent composed of 33 wt % of silver nanoparticles having an average primary particle diameter $D_{50}$ of 72 nm and 67 wt % of Sn—Bi solder powder (ST-5 manufactured by Mitsui Mining & Smelting Co., Ltd.) was applied using a dispenser so that the line width of the adhesive layer was 0.3 mm to form the adhesive layer. After that, the synthetic quartz glass wafer substrate is diced and cut into a 3.4 mm square along the outer periphery of the adhesive layer to obtain a lid for an optical element package including a window material of synthetic quartz glass and an adhesive layer formed of a metal-based adhesive agent.

Example 6

A silicone resin adhesive agent (KER-3000-M2, manufactured by Shin-Etsu Chemical Co., Ltd.) was applied to the outer peripheral edge of the main surface of the synthetic quartz glass substrate with an antireflection film produced in Example 1 by screen printing so that the line width was 0.5 mm, and an adhesive layer was formed. After that, the synthetic quartz glass wafer substrate is diced and cut into a 3.5 mm square along the outer periphery of the adhesive layer to obtain a lid for an optical element package including a window material of synthetic quartz glass and an adhesive layer formed of a metal-based adhesive agent.

(3) Production of Optical Element Package Using Glass Substrate with Antireflection Film as Window Material Example 7

A 30-mW class UV-LED element against 285 nm arranged on a 3.5-mm square surface mount package (SMD PKG) carrier based on aluminum nitride is sealed with the lid for an optical element package produced in Example 5 and the UV-LED SMD PKG was produced. Note that, in the SMD PKG carrier, the surface of the joint with the synthetic quartz glass lid with an antireflection film is gold-plated.

Regarding the produced optical element package, it was confirmed that there was no leak by the gross leak test shown in the US military standard MIL-STD-883 Method 1014. Further, in the fine leak test shown in the standard, the helium leak rate was $5.8 \times 10^{-8}$ atm/cc sec. Further, when the LED in the SMD package was turned on and the transmission by vertical incidence at 285 nm was measured, the transmission was 98.4%.

Example 8

Using the lid for an optical element package of Example 6, the optical element package was produced by joining with SMD PKG in the same manner as in Example 7. When the LED in the SMD package was turned on and the transmission by vertical incidence at 265 nm was measured, the transmission was 98.4%.

(4) Production of Light Irradiation Device

Example 9

On the bottom surface of a cylindrical housing made from SUS having a bottom wall and a side wall, 16 optical element packages (four-by-four arrangement) produced in Example 6 were arranged in a plane. The synthetic quartz glass substrate with an antireflection film produced in Example 1 as a window material was attached to the upper end opening (light emission port: surface facing light emitted from the UVC-LED) of the housing, so that the surface on which the antireflection film was formed was on the light source side. The window material was fixed to the housing by being sandwiched with a flange made from SUS. The transmission of the light emitted from the UVC-LED installed inside the housing was 97.5%.

From the above results, the synthetic quartz glass substrate with an antireflection film of the present invention showed high transmission in the wavelength region of 255 to 300 nm. Further, there is no problem in reliability evaluation for constant temperature and humidity, and the like. Accordingly, it was shown that the synthetic quartz glass substrate with an antireflection film of the present invention can be preferably used in many fields where high transmission or low reflectance is required.

Japanese Patent Application No. 2020-047579 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A synthetic quartz glass substrate with an antireflection film, comprising:
   the synthetic quartz glass substrate; and
   the antireflection film formed on a main surface of the synthetic quartz glass substrate, wherein
   a contact angle of the main surface of the synthetic quartz glass substrate is within 5 degrees, the contact angle being defined by a sessile drop method of JIS R 3257:1999, and
   the antireflection film includes a first layer containing $Al_2O_3$, a second layer containing $HfO_2$, and a third layer containing $MgF_2$ or $SiO_2$ sequentially laminated on the main surface of the synthetic quartz glass substrate,
   wherein the synthetic quartz glass substrate satisfies a relational expression of D99.9−D50<5 nm, where D50 is a median height and D99.9 is a height of 0.1% from a highest height in a height histogram obtained by measuring, with an atomic force microscope, in a 1 μm×1 μm area, which is randomly selected, on the main surface of the synthetic quartz glass substrate.

2. The synthetic quartz glass substrate with an antireflection film according to claim 1, wherein
   optical film thicknesses of the first to third layers are in the following ranges, respectively:

$0.20\lambda \leq n_1 d_1 \leq 0.30\lambda;$ $0.45\lambda \leq n_2 d_2 \leq 0.55\lambda;$ and $0.20\lambda \leq n_3 d_3 \leq 0.30\lambda$ wherein n is a refractive index, d is a physical film thickness, $n_1 d_1$ to $n_3 d_3$ are optical film thicknesses of the first to third layers, respectively, and $\lambda$ is a central wavelength of light transmitted through the synthetic quartz glass substrate with an antireflection film and is selected from a range of 255 to 300 nm.

3. A window material made from the synthetic quartz glass substrate with an antireflection film according to claim 1.

4. A lid for an optical element package having an adhesive layer on an outer peripheral edge of a main surface of the window material according to claim 3.

5. The lid for an optical element package according to claim 4, wherein the adhesive layer is formed of a resin-based adhesive agent or a metal-based adhesive agent.

6. An optical element package comprising:
   a box-shaped housing member;
   an optical element for a wavelength of 255 to 300 nm housed in the housing member; and
   the lid for an optical element package covering an opening of the box-shaped housing member, wherein
   the lid for an optical element package according to claim 4 is joined to the opening of the housing member.

7. The optical element package according to claim 6, wherein the optical element is a light emitting element or a light receiving element.

8. The optical element package according to claim 7, wherein the optical element is a light emitting element.

9. A light irradiation device comprising:
   a housing having a light emission port; and
   at least one light source housed in the housing, wherein the light source is the optical element package according to claim 8.

10. The light irradiation device according to claim 9, further comprising a window material covering the light emission port,
    wherein
    the window material covering the light emission port is a synthetic quartz glass substrate with an antireflection film or without an antireflection film,
    wherein
    the synthetic quartz glass substrate with the antireflection film comprises:
    the synthetic quartz glass substrate; and
    the antireflection film formed on a main surface of the synthetic quartz glass substrate, wherein
    a contact angle of the main surface of the synthetic quartz glass substrate is within 5 degrees, the contact angle being defined by a sessile drop method of JIS R 3257:1999 and
    the antireflection film includes a first layer containing $Al_2O_3$, a second layer containing $HfO_2$, and a third layer containing $MgF_2$ or $SiO_2$ sequentially laminated on the main surface of the synthetic quartz glass substrate.

11. The light irradiation device according to claim 10, wherein the window material covering the light emission port is the synthetic quartz glass substrate with the antireflection film.

12. The synthetic quartz glass substrate with an antireflection film according to claim 1, wherein
    optical film thicknesses of the first to third layers are in the following ranges, respectively:

$0.22\lambda \leq n_1 d_1 \leq 0.28\lambda;$ $0.47\lambda \leq n_2 d_2 \leq 0.53\lambda;$ and $0.22\lambda \leq n_3 d_3 \leq 0.28\lambda$ wherein n is a refractive index, d is a physical film thickness, $n_1 d_1$ to $n_3 d_3$ are optical film thicknesses of the first to third layers, respectively, and $\lambda$ is a central wavelength of light transmitted through the synthetic quartz glass substrate with an antireflection film and is selected from a range of 255 to 300 nm.

13. The synthetic quartz glass substrate with an antireflection film according to claim 1, wherein the contact angle of the main surface of the synthetic quartz glass substrate is 3.8 degrees or less.

* * * * *